UNITED STATES PATENT OFFICE.

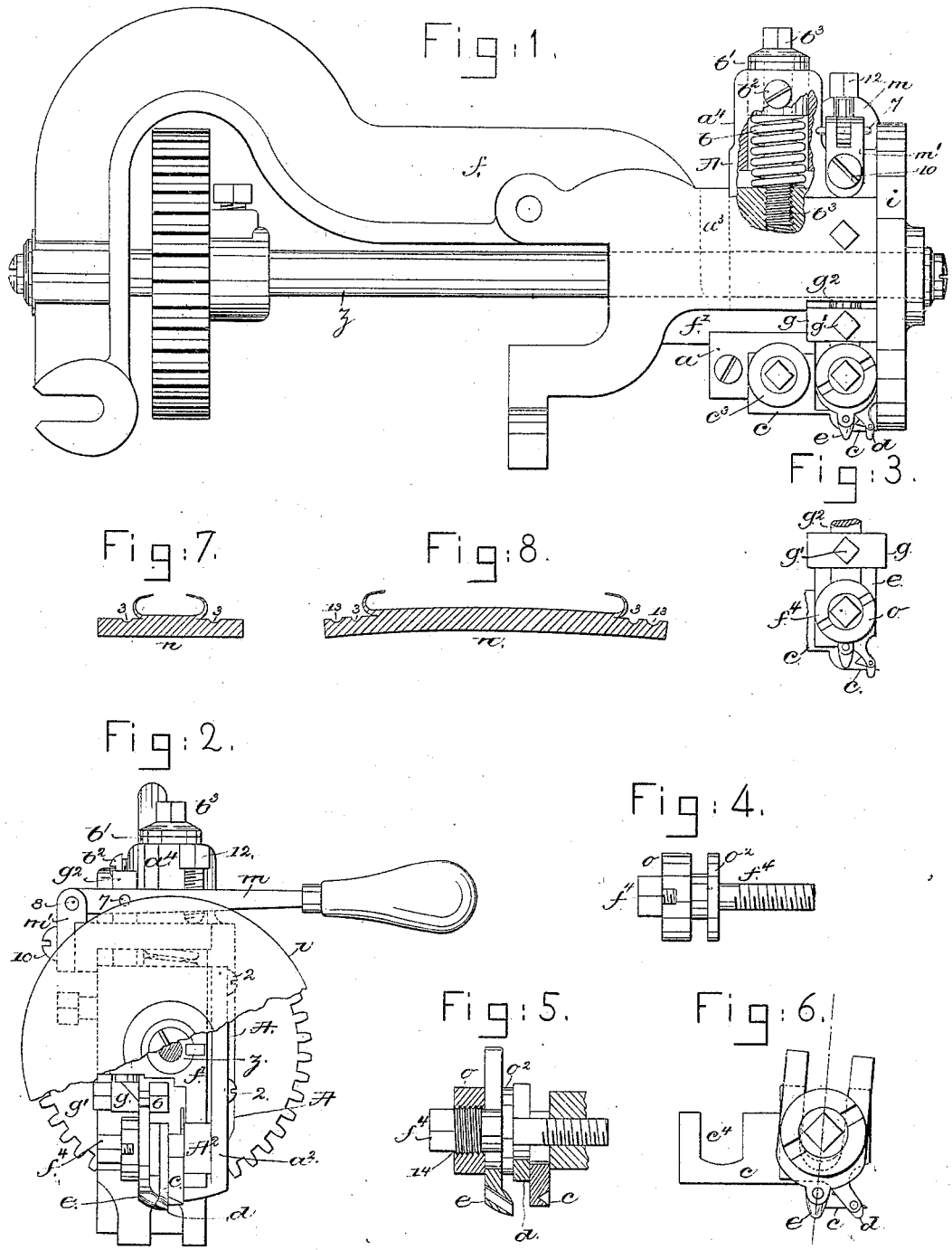

THOMAS B. DILL, OF MEDFORD, MASSACHUSETTS.

CHANNELING-MACHINE FOR BOOTS AND SHOES.

SPECIFICATION forming part of Letters Patent No. 271,227, dated January 30, 1883.

Application filed November 13, 1882. (No model.)

*To all whom it may concern:*

Be it known that I, THOMAS B. DILL, of Medford, county of Middlesex, State of Massachusetts, have invented an Improvement in Channeling-Machines for Boots and Shoes, of which the following description, in connection with the accompanying drawings, is a specification, like letters on the drawings representing like parts.

This invention in channeling-machines has for its object to adjust one of its two groovers vertically, so that it may be readily thrown into or out of operation at will, and to adjust the groovers with relation to each other laterally, according to the distance it is desired to separate the stitch-grooves.

The machine herein described is adapted to cut a channel into the sole from at or near its upper edge to form a lip or flap, and in the said channel, under the lip, is cut one stitch-groove at the shank and two about the fore part of the sole. The groover to be moved vertically is clamped upon a vertically-movable bar connected with a lever mounted upon a head made adjustable on the arm of the machine, so that the said groover, besides being vertically movable by its lever to throw it into and out of operation with relation to the inner groover and lip-cutter, may also be adjusted vertically, together with the inner groover and lip-cutter, with relation to the top or pressure wheel, according to the thickness of the material and the depth of cut it is desired to make therein. The bolt which holds the two groovers has a fixed collar, and outside of it a movable nut-like head by which to hold the outer groover in an adjustable manner.

Figure 1 represents in side elevation and partial section a sufficient portion of a channeling-machine to enable my invention to be understood; Fig. 2, a front end view of Fig. 1, the top wheel being partially broken out to the better show the construction of the parts at the rear of it, some of the parts being dotted behind the part of the said wheel which is not broken away. Fig. 3 is a detail of the two groovers and lip-cutters to be referred to, the outer groover being shown as elevated out of cutting position. Fig. 4 is a separate view, showing the screw which holds the two groovers and permits the adjustment of one of them. Fig. 5 is a sectional detail, showing the said screw and the two groovers and lip-cutter. Fig. 6 is a detail of the two groovers and lip-cutter, to show the method of adjusting the outer groover; and Figs. 7 and 8 show two sections of a sole prepared on the machine herein described, one section being across the shank and the other the ball of the sole. The parts in Figs. 4, 5, and 6 are on an enlarged scale.

My invention will be embodied in a channeling-machine substantially such as shown in United States Patent No. 117,856, to which reference may be had for parts not shown in the accompanying drawings, but may, it is obvious, be applied to other well-known channeling-machines.

The arm $f'$, having on it the top or presser wheel, $i$, and the shaft $z$, are substantially as in the patent referred to, so need not be herein further described. The arm $f'$, near its forward end, has a head, A, flanged at its upper portion, as shown in dotted lines, Fig. 2, to fit over and about the top of the arm, and provided at its lower end (see Fig. 1) with an adjustable flange-plate, $a$, to fit the side of the said arm below. The vertical web or part of the head A at the rear side of arm $f'$ is held and guided vertically between the shank of the foot $a^2$, bearing against one edge, and a narrow plate or projection, $a^3$, (shown in dotted lines, Fig. 1,) screwed to the rear side of the arm $f$, the said plate or projection bearing against the other edge of $a^2$.

The foot $a^2$ is held in place on and made adjustable on the head A by the screws 2. The upper portion of the head A has a hollow hub, $a^4$, which receives in it a spiral spring, $b$, the lower end of which rests on the arm $f'$, while its upper end rests against collar $b'$, held in the hub by a screw, $b^2$. The screw $b^3$ is extended down through the said collar and spring, and is entered into a threaded portion of the arm $f'$, so that by turning the said screw the head A and its attached parts may be adjusted vertically to place the lip-cutter $c$ and inside groover, $d$, in the proper position vertically with relation to the top or presser wheel, $i$. The spring $b$ lifts the head A, while the screw $b^3$ forces it down. The lip-cutter $c$ and inside groover, $d$, are attached by screw $f^4$ to the lower flange, $A^2$, of the head A in usual manner; but the especial screw herein shown is of novel construction. The rear end of the lip-cutter is adjustably held by a second set-screw, $c^3$, extended through the slot $c^4$ (see Fig. 6) and into the part $A^2$. The outside groover, $e$, which it is desired at times to lift out of action, as in Fig. 3, when the shank of the sole $n$ is being grooved at 3, Fig. 7, so as to form but one groove in the channel made by the lip-cutter $c$, has its upper forked ends grasped between the cross-head $g$ and clamping-bar 6, drawn together by the screw $g'$.

The cross-head $g$ forms part of the rod $g^2$, which is guided in the arm $f'$ and has its upper end connected by pin 7 with the groover-lifting lever $m$, pivoted at 8 upon an ear, $m'$, attached by screw 10 to the head A. The lever $m$ has an adjusting-screw, 12, the length of which below the lever determines the descent of the groover $e$. When both groovers are down in operative position, as in Fig. 1, the sole will have two stitch-grooves, 3 and 13, formed in it, both of the said grooves being desired in the channel about the ball or fore part of the sole $n$.

If it is desired to always cut two channels, the screw $g'$ may be loosened, and the movable nut-like head $c$ of the screw $f^4$, which was formerly so placed as to permit the forked shank of the groover $e$ to move freely on the screw as the bar $g^2$ was lifted, as described, will be turned farther on the threaded portion 14 of the screw $f^4$, outside the collar $c^2$, so as to securely attach the outside groover, $e$, to the said screw $f^4$, between the nut-like head $o$ and the collar $o^2$, fixed to the said screw.

The groover $e$ may be adjusted to occupy a position more or less distant from the groover $d$, and may be held in adjusted position by the nut-like head placed outside the collar $o^2$, and the groover $e$ may be adjusted without turning the screw $f^4$ or disturbing the position of the groover $d$ and lip-cutter $c$.

I am aware that a groover attached to an elbow-shaped arm has had a cam and lever to lift it out of operative position; but such groover was not attached to a head having vertical adjustments with relation to the top wheel or presser.

I claim—

1. The arm $f'$, the wheel $i$, the vertically-adjustable head A, placed on the said arm, and its attached groover $d$ and lip-cutter, combined with the groover $e$ and its carrying-rod, made movable in the said head, and with means to lift the said rod and its attached groover independently of the said head, substantially as described.

2. The arm $f'$, the vertically-adjustable head A, mounted thereon, and its attached lip-cutter $c$ and groover $d$, and the groover $e$ and rod $g^2$, with which it is connected, combined with the lever $m$, adapted to reciprocate the said bar $g^2$ in the head A and place the groover $e$ into or out of action, substantially as described.

3. The arm $f'$, the vertically-adjustable head A, mounted thereon, and its attached lip-cutter $c$ and groover $d$, and the groover $e$ and rod $g^2$, with which it is connected, combined with the lever $m$, adapted to reciprocate the said bar $g^2$ in the head A and place the groover $e$ into or out of action, and with an adjusting-screw to determine the descent of the said lever and groover $e$, substantially as described.

4. The screw $f^4$, having the fixed collar $o^2$ and movable nut-like head $o$, combined with the groover $e$, placed between the said collar and nut-like head, whereby the said groover may be adjusted independently with relation to the groover $d$ at the rear side of the said collar, to permit the two groovers to cut stitch-grooves at the desired distance apart, substantially as described.

In testimony whereof I have signed my name to this specification in the presence of two subscribing witnesses.

THOMAS B. DILL.

Witnesses:
G. W. GREGORY,
BERNICE J. NOYES.